(12) United States Patent
Chen et al.

(10) Patent No.: US 10,081,334 B1
(45) Date of Patent: Sep. 25, 2018

(54) METHOD AND SYSTEM FOR UNLOCKING VEHICLE WITH USE OF MORSE CODE

(71) Applicant: Alpine Electronics, Inc., Tokyo (JP)

(72) Inventors: Qijun Chen, Torrance, CA (US); Ben Cannon, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/597,471

(22) Filed: May 17, 2017

(51) Int. Cl.
| | |
|---|---|
| B60R 25/24 | (2013.01) |
| G07C 9/00 | (2006.01) |
| G07C 5/00 | (2006.01) |
| B60R 25/20 | (2013.01) |
| G06Q 30/06 | (2012.01) |

(52) U.S. Cl.
CPC ........ *B60R 25/241* (2013.01); *B60R 25/2018* (2013.01); *G06Q 30/0645* (2013.01); *G07C 5/008* (2013.01); *G07C 9/00817* (2013.01)

(58) Field of Classification Search
CPC .............. B60R 25/241; B60R 25/2018; G06Q 30/0645; G07C 5/008; G07C 9/00817
USPC ................................. 340/5.61, 5.72
See application file for complete search history.

(56) References Cited

U.S. PATENT DOCUMENTS

| | | | |
|---|---|---|---|
| 4,868,409 A | 9/1989 | Tanaka et al. | |
| 2006/0145809 A1* | 7/2006 | Crowhurst | B60R 25/246 340/5.62 |
| 2012/0280783 A1* | 11/2012 | Gerhardt | G07C 9/00309 340/5.6 |
| 2013/0317693 A1* | 11/2013 | Jefferies | G07B 15/00 701/31.5 |
| 2013/0321178 A1* | 12/2013 | Jameel | G08G 1/202 340/989 |
| 2014/0074435 A1* | 3/2014 | Cohn | H04R 29/00 702/184 |
| 2014/0129301 A1* | 5/2014 | Van Wiemeersch | G07B 15/02 705/13 |
| 2014/0187149 A1* | 7/2014 | Lortz | H04W 4/008 455/41.1 |
| 2014/0266594 A1* | 9/2014 | Reiser | B60R 25/24 340/5.72 |
| 2014/0285320 A1* | 9/2014 | Blackmer | B60R 25/23 340/5.72 |
| 2014/0309842 A1 | 10/2014 | Jefferies et al. | |
| 2014/0330486 A1 | 11/2014 | Gehin et al. | |
| 2015/0135336 A1* | 5/2015 | Arasavelli | H04B 7/26 726/29 |

* cited by examiner

*Primary Examiner* — Edwin Holloway, III
(74) *Attorney, Agent, or Firm* — Muramatsu & Associates

(57) ABSTRACT

A method and system for unlocking a reserved vehicle designed to encode an access code assigned by a remote server to a Morse code or pattern by a control box or a head unit provided in the reserved vehicle. The Morse code or pattern is generated in a form of a sound signal or a light signal with use of a vehicle horn or headlight. The Morse code or pattern in sound or light is detected by a pre-existing mobile device, typically, a smartphone of a user without requiring any specific access card or reader. The detected Morse code or pattern is decoded back to the access code or converted an FFT signal by the mobile device and is sent to the server for verification. When successfully verified, the server sends an unlock command to the reserved vehicle so that the user can gain access to the reserved vehicle.

20 Claims, 12 Drawing Sheets

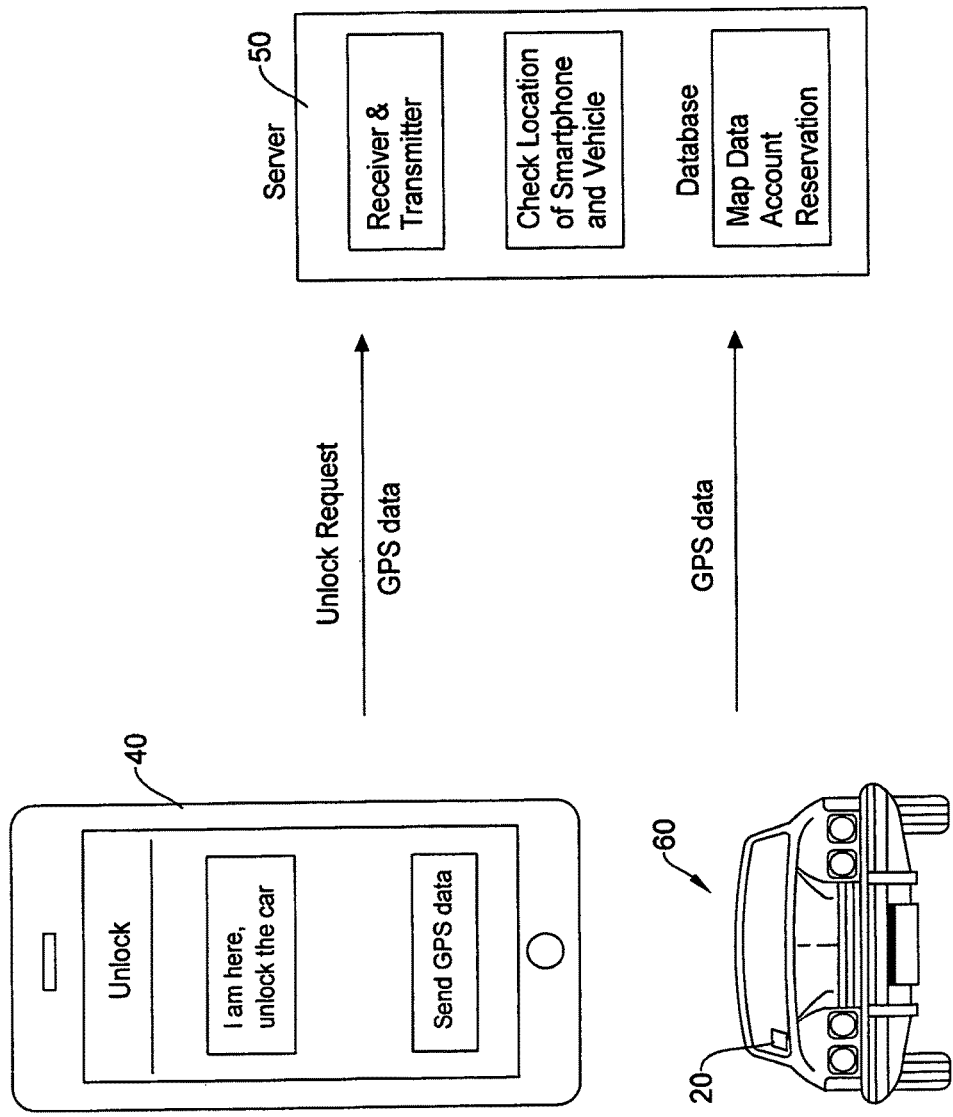

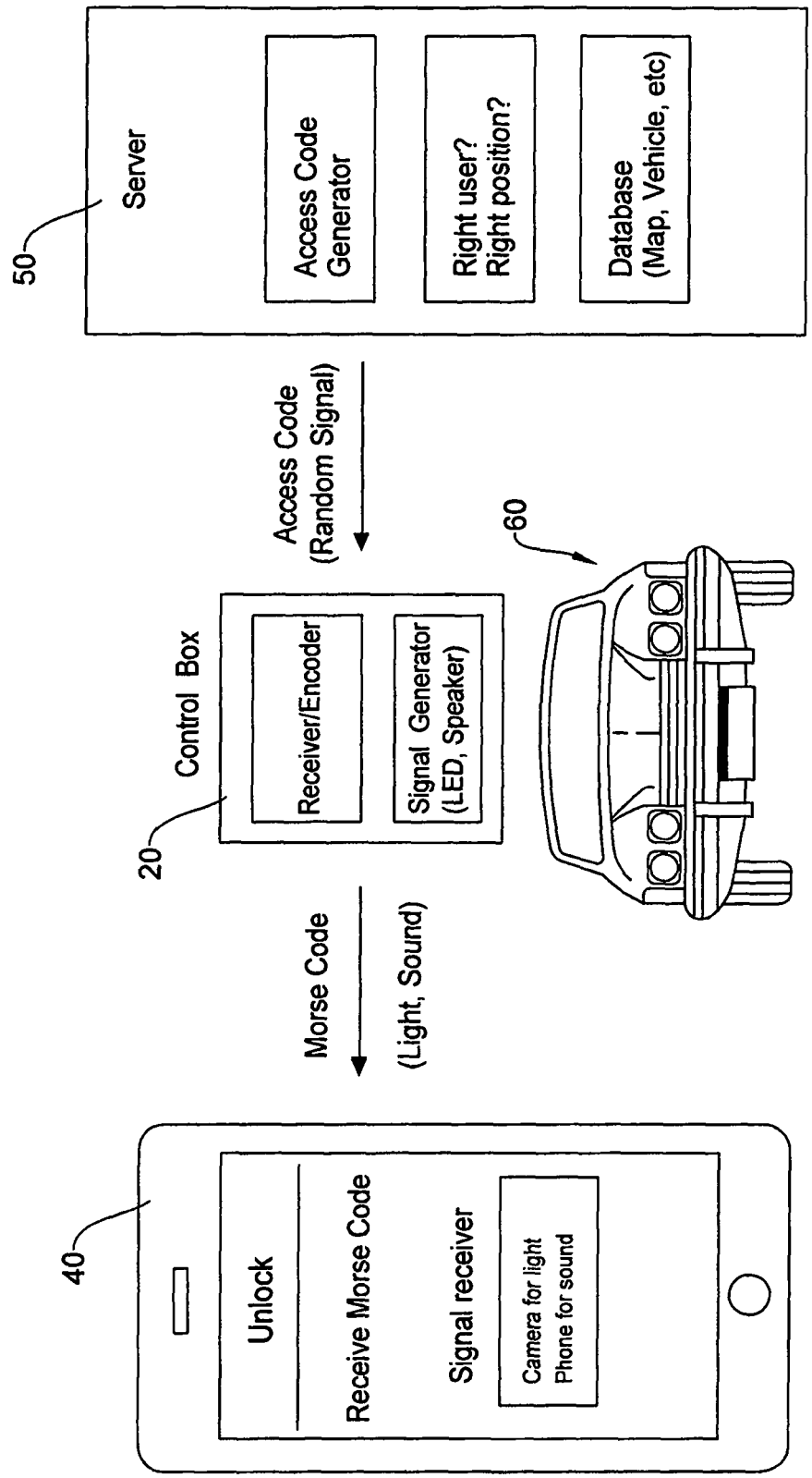

METHOD AND SYSTEM FOR UNLOCKING VEHICLE WITH USE OF MORSE CODE

FIELD OF THE INVENTION

This invention relates to a method and system for unlocking a vehicle with patterns of light or sound such as in Morse code, and more particularly, to a method and system for unlocking and allowing access to a shared vehicle through communication between the vehicle and a mobile device via light or sound patterns such as in Morse code.

BACKGROUND OF THE INVENTION

Vehicle sharing services enabling "car-sharing" have become increasingly popular in the United States and around the world. Individuals gain the benefit of private vehicle use without the costs and responsibility of ownership such as repayment of car loans, finding a parking space, purchasing and maintaining insurance, vehicle upkeep and repair, etc. Instead of owning one or more vehicles, the car sharing model enables individuals and businesses to access a fleet of vehicles on an as-needed, on-demand basis.

In a typical vehicle sharing service, the users are members of the sharing service system operated by a remote service provider. The users may have been pre-approved by the service provider based on, for example, background checks, driving history, criminal record checks, establishment of a payment method and mechanism, etc. Typically, such a vehicle sharing service has several service locations, and the shared vehicle is picked up and returned to a designated service location, such as a parking space, parking lot, or other car sharing center closest to the user.

When the member of the vehicle sharing service wants to use a vehicle, he/she reserves a vehicle over the internet via an app or website on a mobile or computing device, over the phone, or other communication network. At a designated location, the user gains access to the vehicle with use of an access card that includes a vehicle access code. The member must have the access card in hand to unlock and drive the reserved vehicle. Such an access card utilizes communication and data retrieval methods called RFID (Radio Frequency ID), NFC (Near-Field Communication), QR (Quick Response) code, bar code, etc.

For example, for a vehicle sharing service that uses RFID cards, the service provider must install expensive aftermarket RFID readers and cellular modems in the vehicles and provide physical RFID cards to members. When a member made a reservation of a vehicle, the service provider sends an access code in RFID format from a remote server to the reserved vehicle. At the vehicle location, the member retrieves the access code through the RFID card from the reserved vehicle and the RFID card sends the access code to the server. The server then verifies the access code to unlock the vehicle so that the member can gain access to the vehicle.

Conventional vehicle sharing services that use the RFID cards, or other types of cards such as NFC, QR code, bar code, etc., as noted above, are prone to incur high costs due to installation and maintenance of readers and modems unique to such communication and data retrieval methods in the vehicles, as well as the provision of access cards to all users. Further, users are required to retain a special single-use card which may be easily lost or damaged.

Thus, there is a need for a method and system for unlocking vehicles that employ a simpler and lower cost communication methods and devices in order to decrease the overall costs for vehicle sharing services and increase convenience for users of such services.

SUMMARY OF THE INVENTION

It is, therefore, an object of the present invention to provide a method and system for unlocking a shared vehicle via a simpler and lower cost communication method and device, thereby decreasing overall costs for vehicle sharing services and increasing convenience for users of such services.

It is another object of the present invention to provide a method and system for unlocking a shared vehicle through transmission of an encoded pattern such as through Morse code between a vehicle and a pre-existing mobile device during a process for authentication of an access code.

It is a further object of the present invention to provide a method and system for unlocking a shared vehicle through transmission of an encoded pattern such as through Morse code expressed by visible lights or audible sounds between the vehicle and the mobile device.

It is a further object of the present invention to provide a method and system for unlocking a shared vehicle without need for a single purpose communication method and access card, but rather via a mobile device of the user to detect the encoded pattern such as in traditional Morse code generated by the reserved vehicle.

One aspect of the present invention is a method of unlocking a shared vehicle. The method includes the steps of: making a reservation to use a vehicle through a communication between a user and a remote server, where the vehicle is installed with a control box or a head unit designed to conduct operations related to the method of unlocking a vehicle; sending an unlock request to the server via a mobile device of the user when the user has reached a location of the reserved vehicle; sending an access code from the server to the control box or head unit; encoding the access code to a pattern or Morse code by the control box or head unit; generating the pattern or Morse code in a form of a sound signal or light signal via a sound source or a light source of the reserved vehicle; detecting the pattern or Morse code in the form of the sound signal or the light signal by the mobile device; decoding the detected pattern or Morse code to the access code by the mobile device and sending the access code to the server via the mobile device; and sending an unlock command from the server to the control box or head unit when the access code from the mobile device matches with the original access code sent to the control box or head unit, thereby allowing the user to gain access to the reserved vehicle.

In the method of the present invention, the control box is installed in a shared vehicle in an after market situation; and the head unit is an automobile entertainment system of the shared vehicle and additionally includes a configuration identical to that of the control box in an OEM (Original Equipment Manufacturer) situation.

In the method of the present invention, the step of sending the unlock request to the server via the mobile device includes a step of sending GPS data of the mobile device indicating a current position of the user to the server. Further, the step of sending the access code from the server includes a step of checking an identity of the user making the unlock request.

In the method of the present invention, the step of sending the access code from the server includes steps of comparing the GPS data from the mobile device and GPS data retrieved from the control box or head unit indicating a current position of the reserved vehicle; and proceeding to the step of sending the access code from the server only when the current position of the user and the current position of the reserved vehicle match or are proximate with one another.

In the method of the present invention, the step of generating the pattern or Morse code in the form of sound signal or light signal includes a step of generating the sound signal pattern or Morse code by a horn of the vehicle, or generating the light signal Morse code by a headlight of the vehicle.

Further, the step of generating the pattern or Morse code in the form of sound signal or light signal includes a step of generating the pattern or Morse code via sound signal by a speaker provided in the control box or head unit, or generating the pattern or Morse code via light signal by an LED (Light Emitting Diode) provided in the control box or head unit.

In the method of the present invention, the step of detecting the pattern or Morse code with the mobile device includes a step of converting the sound signal pattern or Morse code to an electric signal by a microphone of the mobile device, or a step of converting the light signal pattern or the Morse code to image data by an image sensor of the mobile device.

In the method of the present invention, instead of the step of decoding the detected pattern or Morse code to the access code and sending it to the server, the method further comprises a step of converting the detected pattern or Morse code to an FFT (Fast Fourier Transform) signal by the mobile device, and sending the FFT signal to the server. The method further comprises a step of analyzing, by the server, the FFT signal from the mobile device to determine whether the FFT signal sufficiently reflects the original access code sent to the control box or head unit for verification before sending the unlock command.

Another aspect of the present invention is a system of unlocking a shared vehicle. The system includes: a server operated by a service provider of vehicle sharing service that receives a reservation made by a user to use a vehicle through a communication with the server; a control box or a head unit installed in a reserved vehicle to conduct operations related to the process of unlocking the reserved vehicle; and a mobile device of the user to communicate with the server regarding the process of unlocking the reserved vehicle and to detect signals from the reserved vehicle. Each of the above noted components is further uniquely configured to perform the operational steps defined in the method invention detailed above.

According to the present invention, since the process of unlocking the shared vehicle is performed with use of simpler and lower cost communication method and device, it is possible to dramatically decrease an overall cost involving the vehicle sharing service. Namely, the access code from the server is encoded to a pattern or Morse code which can be generated in the form of sound or light by using the existing resources such as the horn or the headlight of the vehicle or the low cost speaker or LED in the control box. Further, the generated pattern or Morse code is detected by the pre-existing mobile device of the user, typically a smartphone, it is unnecessary to use an access card required in the conventional technology, which further makes it possible to decrease the overall cost.

BRIEF DESCRIPTION OF THE DRAWINGS

FIG. 7 is a schematic diagram showing an example of the process in which the user sends an unlock request to the server via the smartphone when the user has reached the location of the reserved vehicle.

FIG. 8 is a schematic diagram showing an example of the process in which the server sends an access code to the control box in the vehicle which is encoded to a pattern or Morse code, and the pattern or Morse code is detected by the user's smartphone.

DETAILED DESCRIPTION OF THE PREFERRED EMBODIMENT

The present invention will be described in detail with reference to the accompanying drawings. The method and system for unlocking a reserved vehicle in the present invention is designed to encode an access code assigned by a remote server to a pattern or Morse code which is generated by sound or light in an inexpensive way. Such a pattern or Morse code can be easily detected by a mobile device such as a smartphone of the user and decoded back to the access code which is sent to the server for verification. When successfully verified, the server sends an unlock command to the reserved vehicle so that the user can gain access to the reserved vehicle. The present invention for unlocking the reserved vehicle is advantageously implemented in vehicle sharing services. It should be noted that within the context of the present invention, although terms "mobile device" and "smartphone" are interchangeably used, the mobile device is not limited to the smartphone but can be a tablet computer, a laptop computer, a wearable computer, etc., so long as it is able to wirelessly communicate with the server.

Figure 1:
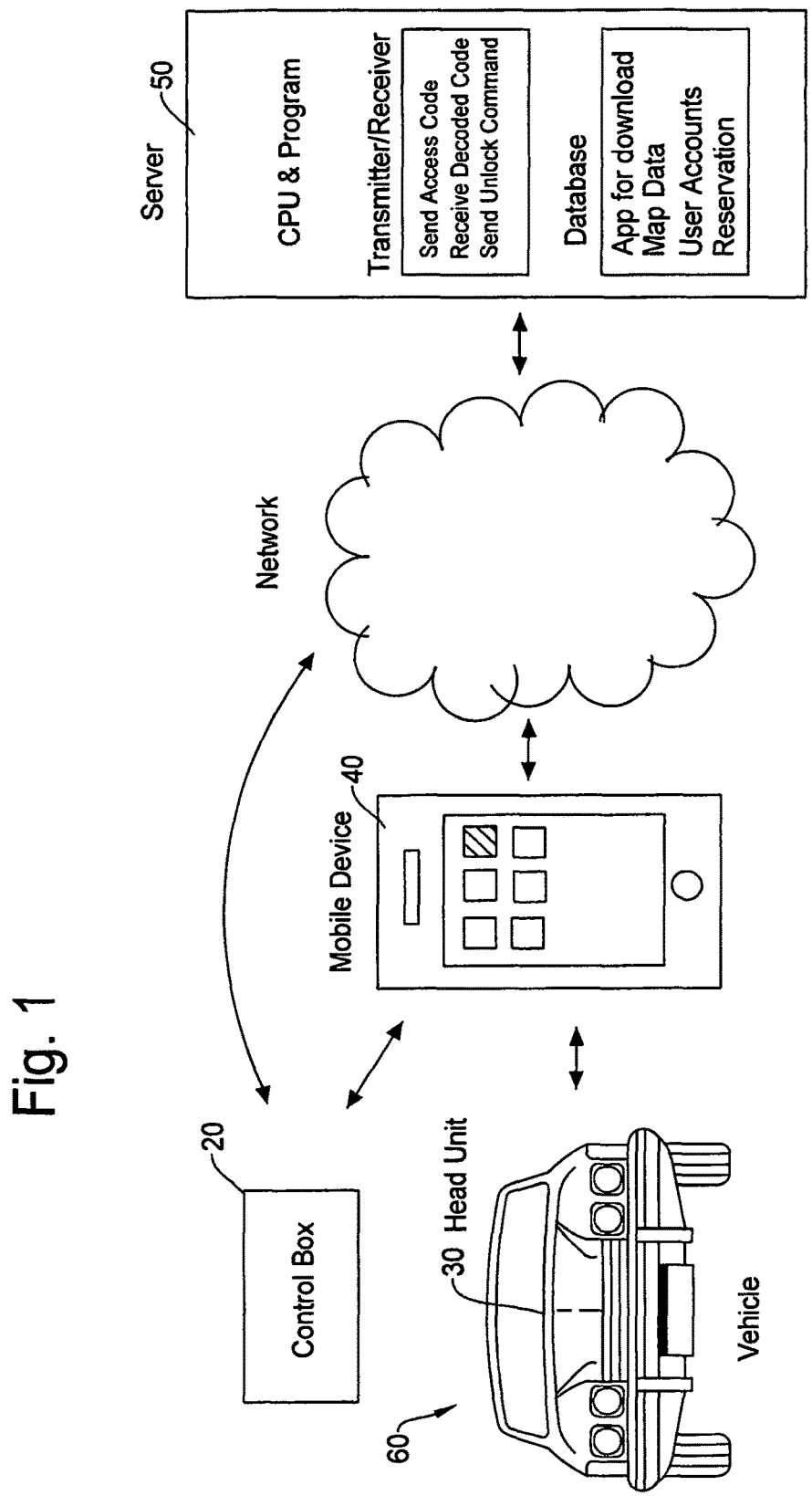
FIG. 1 is a schematic block diagram showing a basic structure of a vehicle sharing service implementing the method and system for unlocking the vehicle according to the present invention.

FIG. 1 is a schematic block diagram showing a basic structure of a vehicle sharing service implementing the method and system for unlocking the vehicle according to the present invention. As noted above, the present invention makes use of light or sound signals transmitted in patterns or in traditional Morse codes, so that communication between the vehicle and the user can be made at no additional cost by leveraging the vehicle's preexisting headlights, interior lights or horn, and the user's mobile device. Light and sound signals transmitted in patterns or Morse code can be easily detected by a user's mobile device, such as a smartphone via its microphone or camera.

In FIG. 1, a vehicle 60 has a head unit 30 which is an automobile interface and entertainment system that typically includes an audio and video player. In an OEM (Original Equipment Manufacture) case, the head unit 30 may have preinstalled application software and hardware components to carry out the shared vehicle unlocking method of the present invention. The application software performs the operations such as sending a vehicle GPS position to the remote server, encoding the access code from the server to a pattern or Morse code, and causing the vehicle 60 or other means to produce the pattern or Morse code in sound or light signals. In an aftermarket case, where the OEM vehicle head unit is replaced or supplemented with additional features, the above noted operations may be carried out by a control box 20 installed in the vehicle 60 where application software and hardware components are installed in the control box 20 to carry out the shared vehicle unlocking method of the present invention.

In the present invention, rather than the dedicated access cards and unique communication method of the conventional technology, the user's existing mobile device 40, typically a smartphone, is used for communication with the vehicle 60 and with the server 50. The user communicates with the remote service provider (server) 50 via the smartphone 40 to reserve the vehicle 60, to send an unlock request and GPS data to the server 50, to send the code detected from the vehicle 60 to the server 50, etc., through the network. It should be noted that the network illustrated in FIG. 1 is omitted in the other drawings for simplicity of description.

Typically, the service provider runs the server 50 to implement the vehicle sharing services involving the method of the present invention for unlocking the reserved vehicle. The server 50 may allow a user to download the application software to his/her smartphone 40 so that the user can reserve a vehicle and enjoy the vehicle sharing service. When the user arrives at the location of the reserved vehicle 60, via the smartphone 40, the user sends an unlock request along with his/her GPS location data to the server 50 so that the server can determine whether the right person is at the right vehicle.

Then, the server 50 sends an access code unique to a particular vehicle sharing case to the vehicle 60 which is encoded to a pattern or Morse code by the control box 20 or head unit 30 as noted above. Such a pattern or Morse code produced in the form of sound or light is detected by the smartphone 40 and is decoded back to the access code. The smartphone 40 sends back the decoded access code to the server 50 for verification. If the verification is successful, the server 50 sends an unlock command to the control box 20 or the head unit 30 to unlock the vehicle door so that the user can gain access to the reserved vehicle 60.

Figure 2:
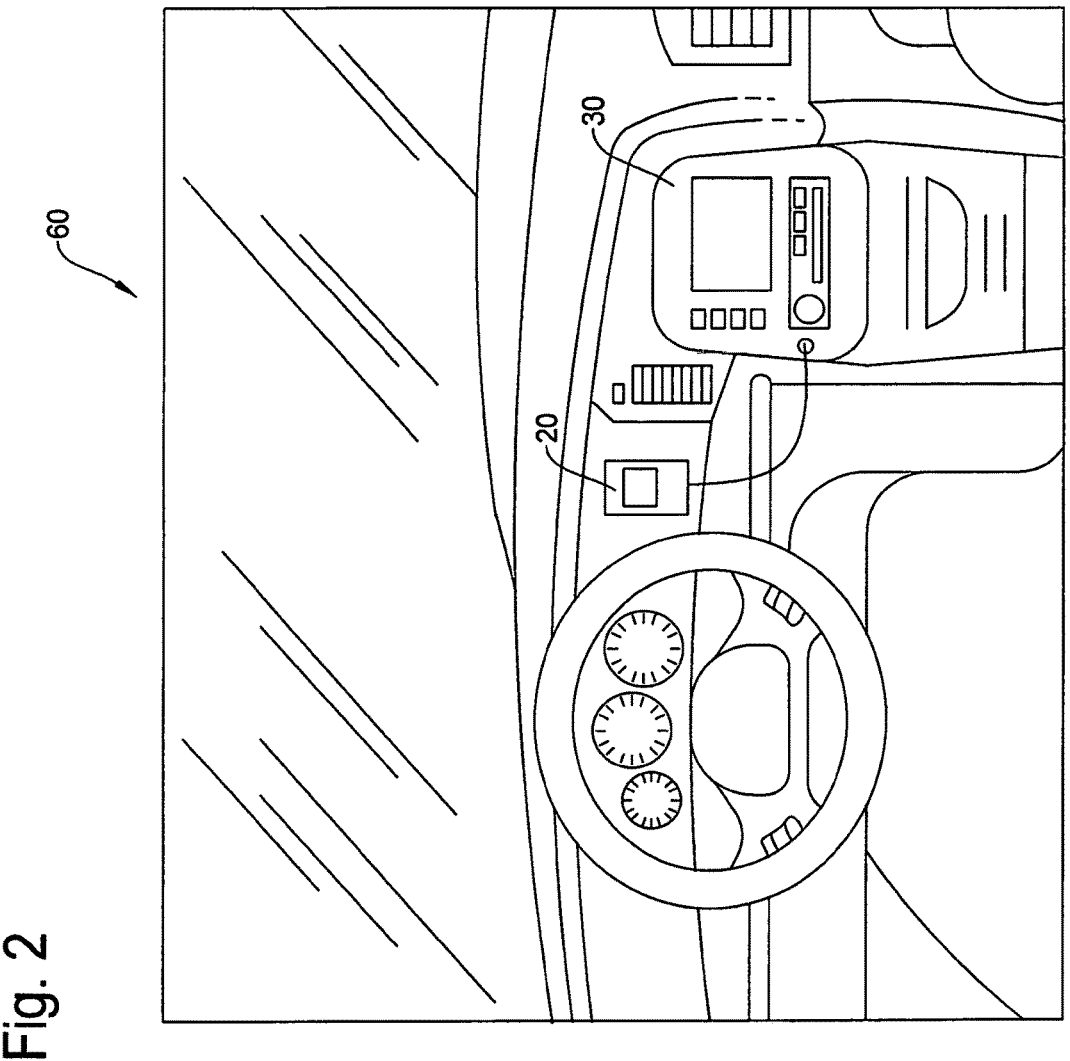
FIG. 2 is a diagram showing an example of an interior arrangement of a vehicle in which either a head unit or a control box encodes an access code from a server to a pattern or Morse code in the present invention.

FIG. 2 is a diagram showing an example of an interior arrangement of a vehicle which includes either the head unit 30 or the control box 20 to perform the specific functions required in the present invention. In the OEM (Original Equipment Manufacture) case, the head unit 30 is configured to perform the functions of sending a vehicle GPS position to the remote server 50 via a transmitter, receiving an access code from the server 50 via a receiver, encoding the access code from the server 50 to the pattern or Morse code, causing the vehicle 60 or other means to produce the pattern or Morse code in sound or light signal, and unlocking the door of the vehicle 60 upon receipt of the unlock command from the server 50. To produce the pattern or Morse code in sound or light by the vehicle 60, and to unlock the vehicle door, etc., the head unit 30 is connected to the vehicle 60 via a CAN (Control Area Network) bus. As known in the art, CAN bus is a vehicle bus standard designed to allow microprocessors and devices to communicate each other in applications without a host computer.

In the aftermarket case, rather than the head unit 30, the control box 20 may be installed in the vehicle 60 to implement the present invention. The control box 20 is configured to perform the operations similar to that of the head unit 30 noted above and is connected to the vehicle 60 via the CAN bus. In one embodiment, the control box 20 may include a signal generator having a speaker and/or light source (ex. LED) to generate the pattern or Morse code in sound or light by itself. In such a situation, the control box 20 may preferably be mounted so that it is visible without obstruction through a windshield of the vehicle 60, so that the user can easily pick up the pattern or Morse code generated by the sound or light. Alternatively, the control box 20 causes the vehicle 60 to produce the pattern or Morse code in light by the interior light or headlight of the vehicle 60 or in sound by the horn of the vehicle 60.

Figure 3:
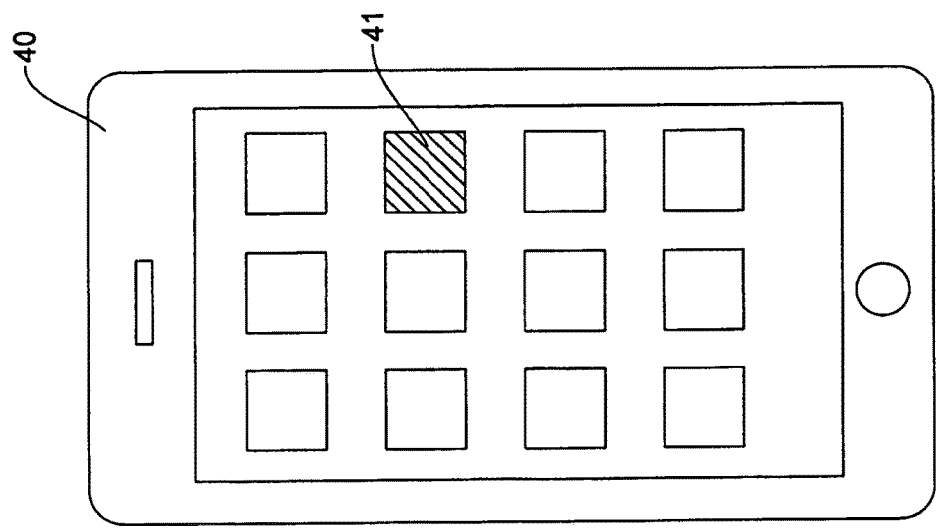
FIG. 3 is a schematic diagram showing a smartphone as an example of mobile device to implement the method and system of the present invention for unlocking the vehicle.

FIG. 3 is a schematic diagram showing a smartphone 40 as an example of mobile device to implement the method and system of the present invention for unlocking the shared vehicle. Typically, the user of the vehicle sharing service are members of the sharing service operated by the remote service provider. The users have been pre-approved by the service provider when they satisfied the predetermined conditions. Then, the member is permitted to make vehicle reservations via the application software from the service provider downloaded and installed on his/her mobile device such as a smartphone 40. Thus, in the example of FIG. 3, the user is able to use the vehicle sharing service by opening a "car-sharing" application icon 41 indicating the vehicle sharing service.

Figure 4:
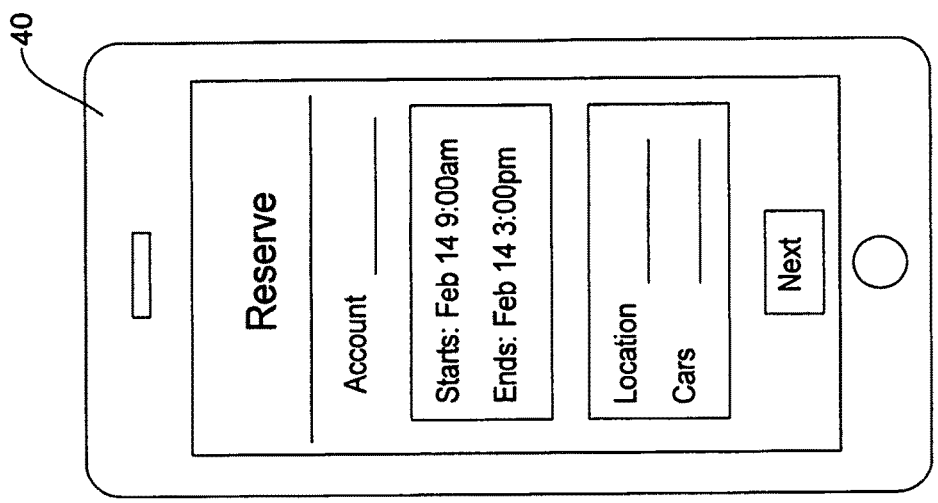
FIG. 4 is a schematic diagram showing an example of smartphone display when a user makes a reservation for a vehicle through a vehicle sharing service.
Figure 6:
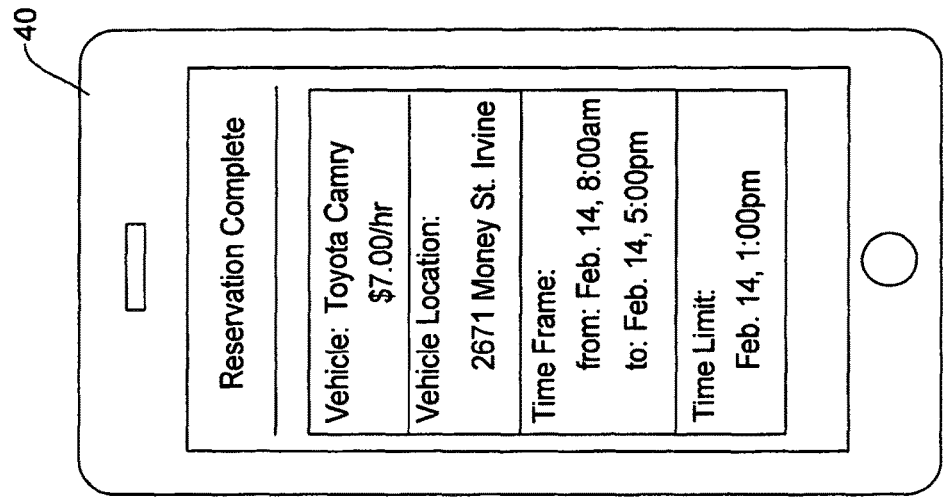
FIG. 6 is a schematic diagram showing an example of smartphone display proceeding the example of FIG. 5 in which the reservation has been completed.
Figure 5:
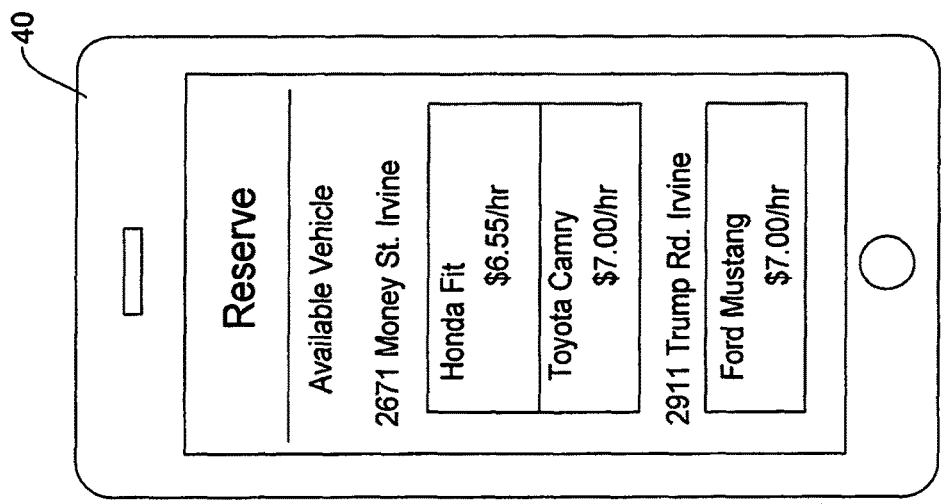
FIG. 5 is a schematic diagram showing an example of a smartphone display during the reservation process proceeding the example of FIG. 4.

To enjoy the vehicle sharing service, the first step for the user to proceed is to reserve a vehicle in such a manner shown in FIGS. 4-6, which show examples of smartphone displays illustrating the reservation process. In the example of FIG. 4, the user starts the reservation process by specifying an user ID (ex., email address, account number), a start time, an end time, and the user's location, a type of vehicle, etc., via the smartphone 40. In response, as in the example of FIG. 5, the server 50 sends to the user the information regarding available vehicles, locations of the vehicles, hourly rates, etc. that satisfy the user's inputs. When the user selects the time, location and vehicle, etc., via the smartphone display, the server 50 will preferably send a reservation number or a confirmation number to the user's smartphone 40, and the reservation process will be completed as shown in FIG. 6.

FIG. 7 is a schematic diagram showing an example of process in which the user sends an unlock request to the server via the smartphone when the user has arrived at the location of the reserved vehicle. To gain access to the reserved vehicle 60, at the location of the reserved vehicle 60, the user sends an unlock request to the server 50. For example, the application program in the smartphone 40 displays a key indicating "I am here, unlock the car" on the smartphone 40, and the user taps the key to send this request to the server 50.

When the smartphone 40 sends the unlock request as described above, the smartphone 40 may automatically send GPS (Global Positioning System) data to the server 50.

Alternatively, the smartphone 40 displays a "Send GPS data" key to prompt the user to tap the key. With respect to recent smartphones and other mobile devices, it is known that such devices have preinstalled GPS receivers which receive GPS signals from a plurality of GPS satellites and determine an absolute position of the user's smartphone based on the GPS signals.

Thus, the server 50 receives the GPS data from the smartphone 40 indicating the absolute position of the user which is compared with the position of the reserved vehicle 60. Preferably, the control box 20 or head unit 30 in the vehicle 60 designed for implementing the present invention has a preinstalled GPS receiver to send the information on the vehicle position to the server 50 anytime as needed. Alternatively, in such a vehicle sharing service, vehicles to be shared are parked at a specified location known to the server 50, thus, the server 50 knows the position of the reserved vehicle in advance.

During this process, the user's identity can be confirmed by the server 50 by, for example, retrieving the user's access credentials, e.g. account number or reservation number, biometrics, etc., from the smartphone 40. Namely, the application program in the smartphone 40 is designed to automatically send the user's account number, etc., to the server 50 or prompt the user to send the account number, reservation number, or biometrics, etc., to the server 50. Thus, the server 50 is able to determine whether the unlock request has been made by the right person with the correct access credentials, at the right place, i.e., the location where the user position and the vehicle position match each other.

Figure 9:
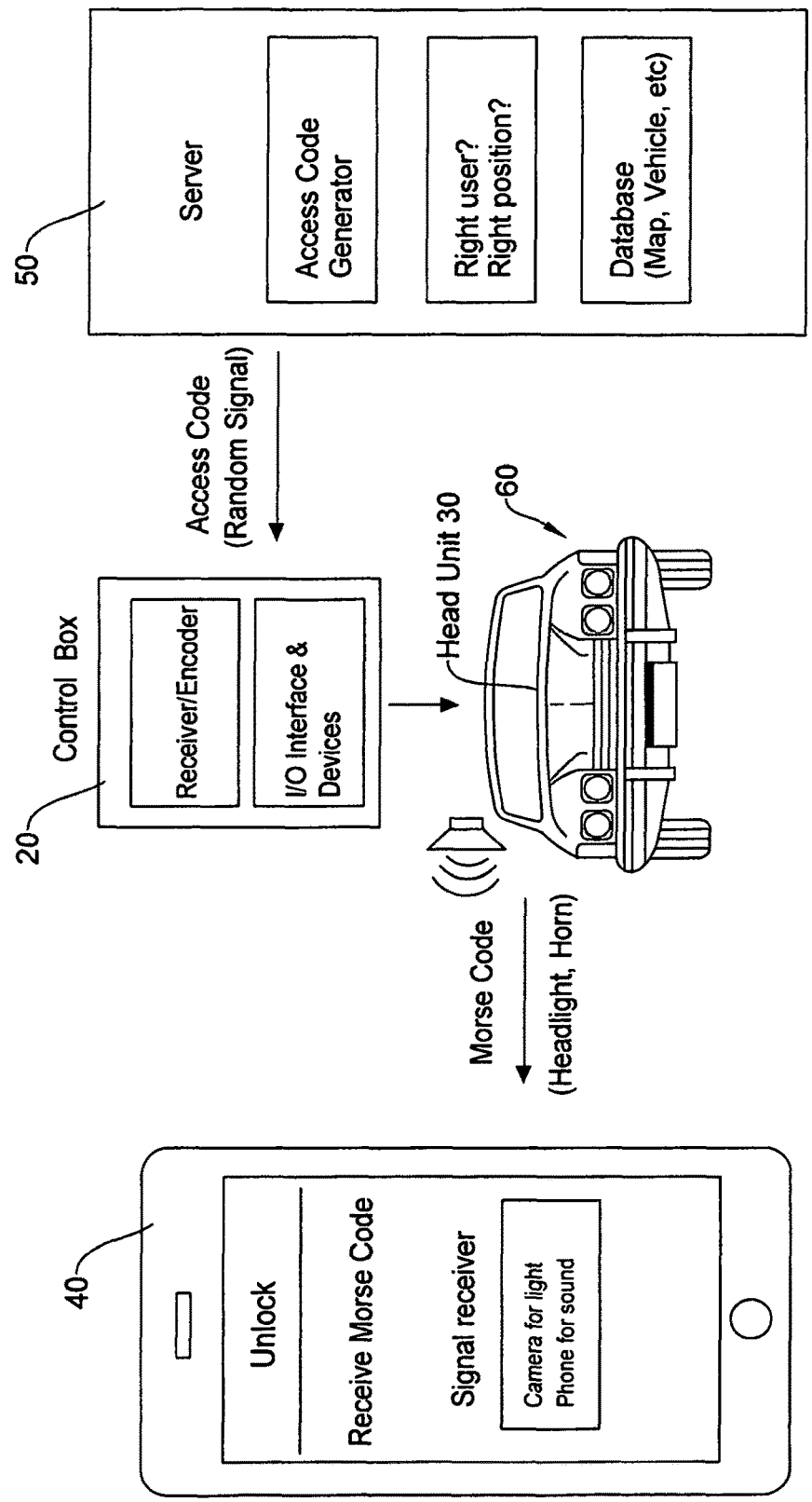
FIG. 9 is a schematic diagram showing an example of the process in which the server sends an access code to the head unit of the vehicle which is encoded to a pattern or Morse code, and the pattern or Morse code is detected by user's smartphone.

FIGS. 8 and 9 are schematic diagrams showing examples of process when the user's identity has been confirmed, and the location of the user and the location of the reserved vehicle have been confirmed to match with one another. FIG. 8 shows the case in which the control box 20 designed to implement the present invention is installed in the vehicle 60. The control box 20 in this case includes a signal generator, for example, a speaker and/or LED to generate the pattern or Morse code in the form of sound or light. FIG. 9 shows the case in which the control box 20 or the head unit 30 is designed to make use of the horn, speakers, cabin lights and/or headlights of the vehicle 60 to generate the pattern or Morse code.

In both cases, the server 50 sends an access code, which may be in the form of a random signal, to the vehicle 60. As noted above, in the present invention, the access code is encoded to a pattern or Morse code so that it can be reproduced in ways perceptible by humans and detectable by mobile devices, such as light or sound. As is known in the art, a Morse code is a type of code that is used to send telegraphic information using rhythm. The Morse code uses "dots" and "dashes" (i.e., by combinations of short notes and long notes) to represent the alphabet letters, numbers, etc., of a given message. When messages are sent by Morse code, dots are expressed by short beeps of sound or short flashes of light, and dashes are expressed by long beeps of sound or long flashes of light.

Other than Morse code, the access code may be encoded to an arbitrary pattern of light or sound signals. Similar to the use of dots and dashes in Morse code, light signals may be transmitted in a series of long and short flashes or varying brightness or colors. For sound signals, the access code may be encoded to a series of musical notes. Further, a combination of sound and light signals may be used to transmit the access code in a light, musical patterns, Morse code or a combination thereof. Thus, it should be noted that in this disclosure, such a pattern or Morse code may also collectively be referred to as "coded pattern".

In the example of FIG. 8, upon confirming the user's identity and location, the server 50 sends the access code to the control box 20 in the reserved vehicle 60. A signal receiver in the control box 20 receives the access code from the server 50. The access code is then encoded to a pattern or Morse code by an encoder in the control box 20. In this example, the control box 20 includes a dedicated signal generator, i.e., a speaker as a sound source and an LED as a light source to transmit the pattern or the Morse code in the form of sound or light. For this purpose, it is preferable that the control box 20 is placed, for example, on an inner surface of the windshield of the vehicle so that the user can easily position the smartphone 40 close to the control box 20. Since the smartphone 40 has a camera and a microphone, it can easily detect the pattern or Morse code from the vehicle 60 (control box 20).

The example of FIG. 9 shows the case in which the pattern or Morse code is generated by the existing headlight or horn of the vehicle 60, rather than the dedicated speaker or LED of the control box 20 shown in FIG. 8. Upon confirming the user's identity and location, the server 50 sends the access code to the control box 20 or the head unit 30 in the reserved vehicle 60. Similar to the example of FIG. 8, the signal receiver in the control box 20 or head unit 30 receives the access code which is encoded to the pattern or Morse code by the encoder in the control box 20 or head unit 30.

In this example, the control box 20 or the head unit 30 is designed to drive the headlight and/or horn of the vehicle 60 to generate the pattern or Morse code in the form of light or sound. Alternatively, a light source other than the headlight, such as the vehicle's cabin light, brake light, etc., can also be used for generating the pattern or Morse code. Further, a sound source other than the horn, such as existing speakers in the vehicle can also be used for generating the pattern or Morse code. Since the smartphone 40 has a camera and a microphone, it can easily detect the pattern or Morse code from the vehicle 60. For example, the microphone can convert the pattern or Morse coded sound to an electric signal, and the camera can convert the pattern or Morse coded light to image data by its CCD (Charge Coupled Device) sensor, for further processing by the smartphone 40.

Figure 10:
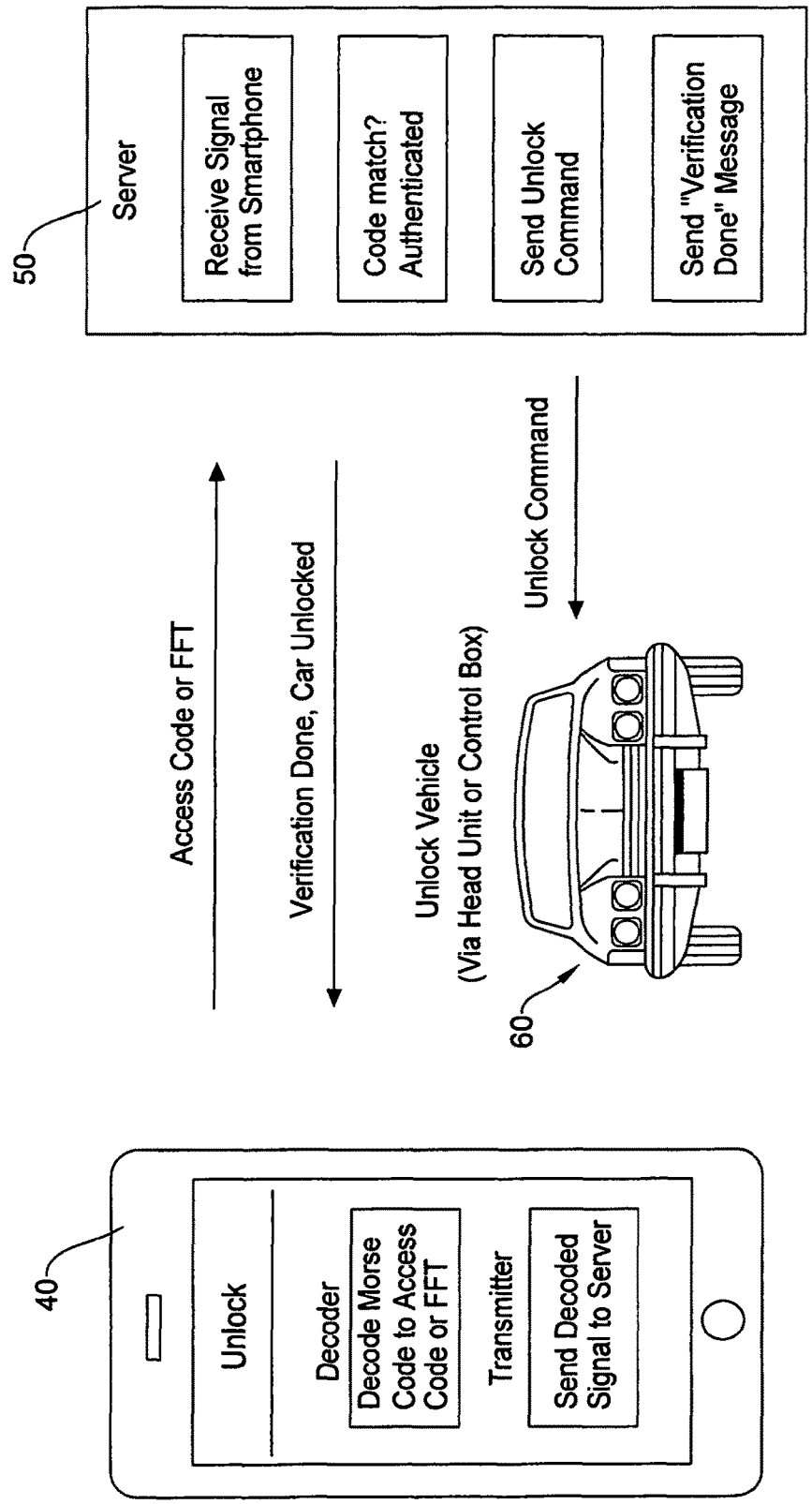
FIG. 10 is a schematic diagram showing an example of a process in which the user sends the detected code to the server via the smartphone, and if verified, the server sends an unlock command to the reserved vehicle.

FIG. 10 is a schematic diagram showing an example of a process in which the user sends the detected code to the server via the smartphone, and if verified, the server sends an unlock command to the reserved vehicle. When the user receives the pattern or Morse code in the form of a sound or light signal via the smartphone 40 in the manner shown in FIG. 8 or FIG. 9, the smartphone 40 decodes the detected pattern or Morse code to the access code. Since the detected pattern or Morse code is in the form of an electric signal or image data, the smartphone can easily process the pattern or Morse code to decode back to the access code. Then, the smartphone 40 sends the access code to the server 50 for verification.

The server 50 compares the access code from the smartphone 40 with the original access code to determine whether the original access code has been received by the correct user via the correct vehicle. If the codes match with one another, the server 50 sends an unlock command to the control box 20 or the head unit 30 of the reserved vehicle 60. Upon receipt of the unlock command, the control box 20 or the head unit 30 unlocks the vehicle 60 via its I/O interface and device (see FIGS. 14 and 15). Preferably, at the same time, the server 50 will send a message to the user indicating that the verification is complete and the vehicle is unlocked.

Figure 15:
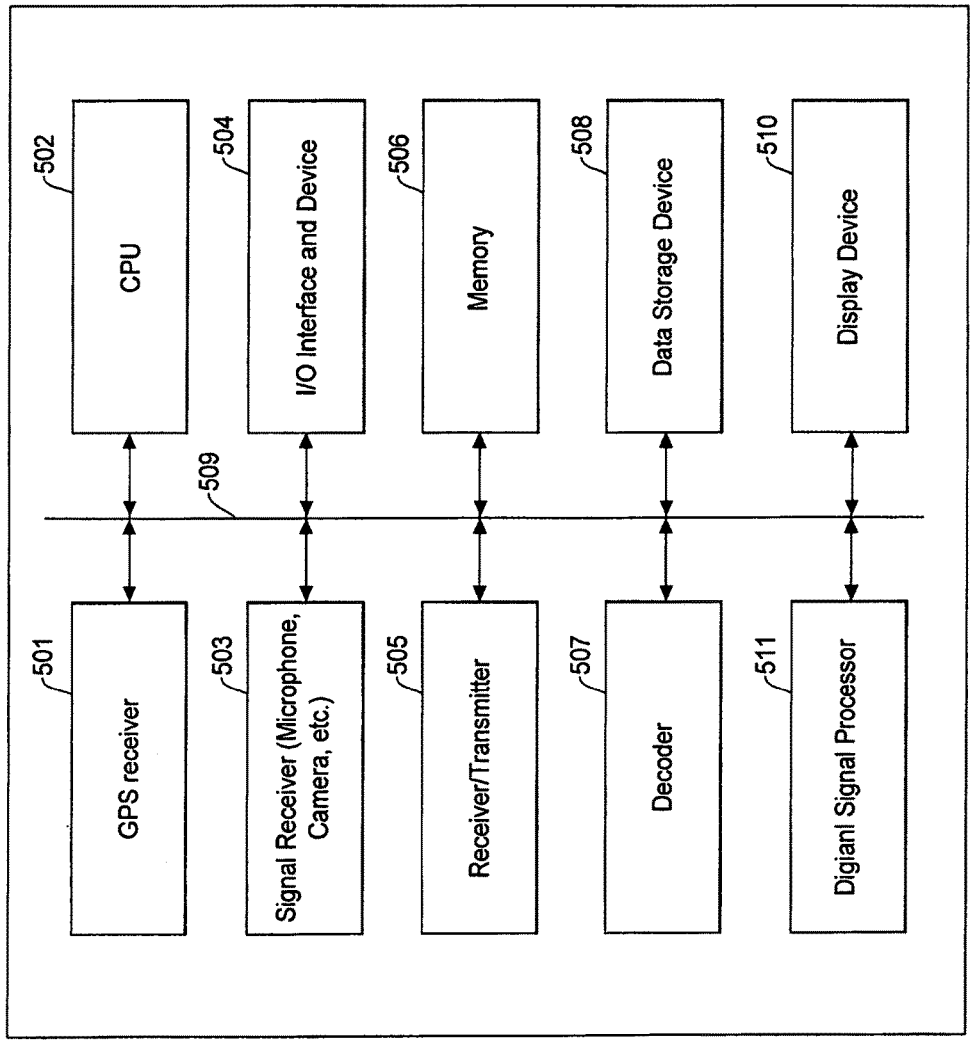
FIG. 15 is a functional block diagram showing an example of structure in the smartphone for implementing the method for unlocking the vehicle by using pattern or Morse code authentication in accordance with the present invention.

In the above noted embodiment, the smartphone 40 decodes the detected pattern or Morse code to the access code to be sent back to the server 50. In another preferred embodiment, the smartphone 40 decodes the detected pattern or Morse code to a FFT (Fast Fourier Transform) signal. For this purpose, as shown in FIG. 15, the smartphone 40 may include a Digital Signal Processor (DSP) to convert the detected pattern or Morse Code, a time domain signal, to an FFT signal, a frequency domain signal. Namely, as known in the art, an FFT signal is constituted by a series of frequency spectrum in the frequency domain where each frequency spectrum is expressed by its amplitude, i.e., frequency/amplitude pairs.

The pattern or Morse code generated in the form of sound or light by the vehicle is very slow because the horn or headlight of the vehicle is designed to be audible or visible by human beings. Further, as known in the art, such a slow pattern or Morse code must be sampled by a relatively slow sample clock before being converted to FFT. However, once the pattern or Morse code is converted to the FFT signal, the smartphone 40 can reproduce the FFT signal at high speed by, for example, using a high speed clock signal, to send the FFT signal to the server 50 in a short period of time. Then the smartphone 40 will send the FFT signal to the server 50 for the authentication of the user and the unlocking procedure noted above.

Figure 11:
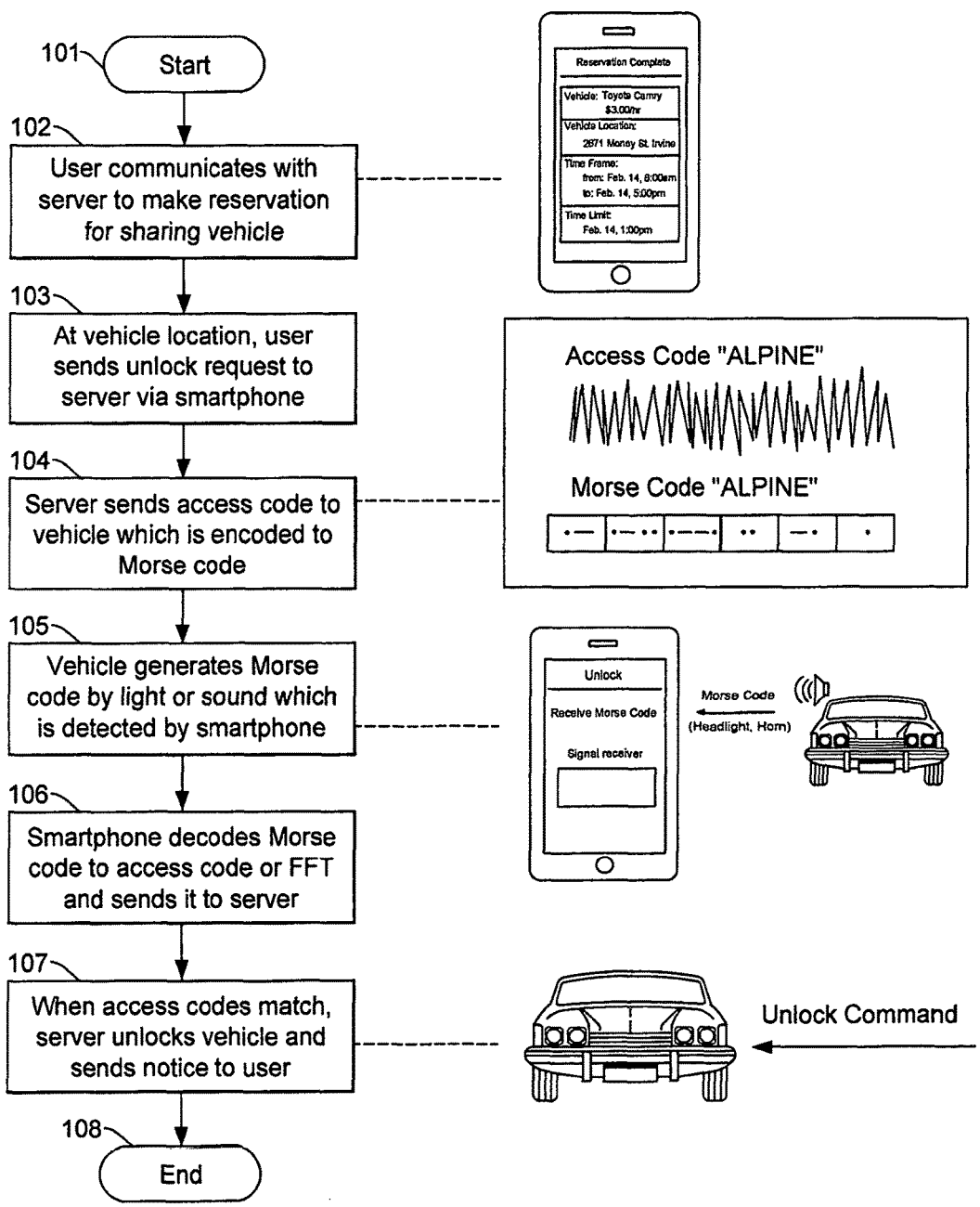
FIG. 11 is a flowchart showing an operational flow of the method for unlocking the reserved vehicle by using the pattern or Morse code in accordance with the present invention.

FIG. 11 is a flowchart showing an operational flow of the method for unlocking the reserved vehicle by using the pattern or Morse code in accordance with the present invention. At step 101, the process starts by, for example, opening a "car-sharing" application on a mobile device of the user, typically the smartphone 40, as shown in FIG. 3. Then, at step 102, the user starts communication with the server 50 to make a reservation for a vehicle. Typically, a day and time range, a location of a vehicle, a type of a vehicle, amount of charges, etc. will be confirmed in addition to the user's identification (account number, reservation number, etc.) as shown in FIGS. 4-6.

In step 103, on the reserved day and time, the user comes to the location of the reserved vehicle 60, and via his/her smartphone 40, sends an unlock request to the server 50 as shown in FIG. 7. The server 50 is able to confirm that the correct person is making the request by confirming the reservation number, an account number, or a confirmation number, etc. At the same time, the smartphone 40 also sends the GPS data indicating the current position of the user (smartphone) to the server 50. At any time, the server 50 retrieves the GPS data indicating the current position of the reserved vehicle 60 from a GPS receiver in the control box 20 or the head unit 30 in the vehicle 60 (see FIG. 14). Alternatively, the location of the reserved vehicle 60 may be known by the server 50 in advance in a case where such sharing vehicles are always parked in a predetermined fixed location, thus it may be unnecessary to newly retrieve the GPS data of the reserved vehicle 60.

When it is determined that the position of the user and the position of the reserved vehicle 60 match with one another, the server 50 knows that the user is making the unlock request at the correct location. Thus, in step 104, the server 50 sends an access code to the control box 20 or the head unit 30 in the reserved vehicle 60. The access code is encoded to a corresponding pattern or Morse code by the control box 20 or the head unit 30. For example, as shown in FIG. 11, an access code "ALPINE" in a random signal fashion is converted to a Morse code "ALPINE" in a traditional short-note and long-note combination.

At step 105, the pattern or Morse code is generated in the form of a sound signal or a light signal as shown in FIGS. 8 and 9. In the example of FIG. 8, the control box 20 includes a dedicated signal generator such as a speaker for generating sounds or an LED for generating lights (see also FIG. 14) so that the control box 20 directly generates the pattern or Morse code by sound or light. In the example of FIG. 9, the control box 20 or the head unit 30 causes the vehicle 60 to generate the pattern or Morse code by the horn as a sound signal and the headlight as a light signal. Since the user is next to the reserved vehicle 60, he/she can easily receive the pattern or the Morse code in the form of the sound signal or the light signal by directing the smartphone 40 to the vehicle 60.

In step 106, as shown in FIG. 10, the smartphone 40 decodes the detected pattern or Morse code to the access code by a decoder (see FIG. 15). The smartphone 40 sends the access code to the server 50 for verification. As noted above, rather than decoding to the access code, the smartphone 40 may decode the pattern or Morse code to a FFT (Fast Fourier Transform) signal by a DSP (Digital Signal Processor) to convert the detected pattern or Morse Code, a time domain signal, to an FFT signal, a frequency domain signal. The smartphone 40 sends the FFT signal to the server 50.

In step 107, the server 50 examines the access code from the smartphone 40 to determine whether the received access code matches the original access code. If the two access codes match with one another, the server 50 sends an unlock command to the control box 20 or the head unit 30, thereby unlocking the vehicle 60. In the case of the FFT signal, the server 50 examines the FFT signal and if the FFT signal clearly reflects the original access code, the server 50 will send the unlock command. Preferably, at the same time, the server 50 will send a message to the user indicating that the verification is complete and the vehicle is unlocked. Thus, the user is able to access the reserved vehicle 60, and at step 108, the process ends.

Figure 12:
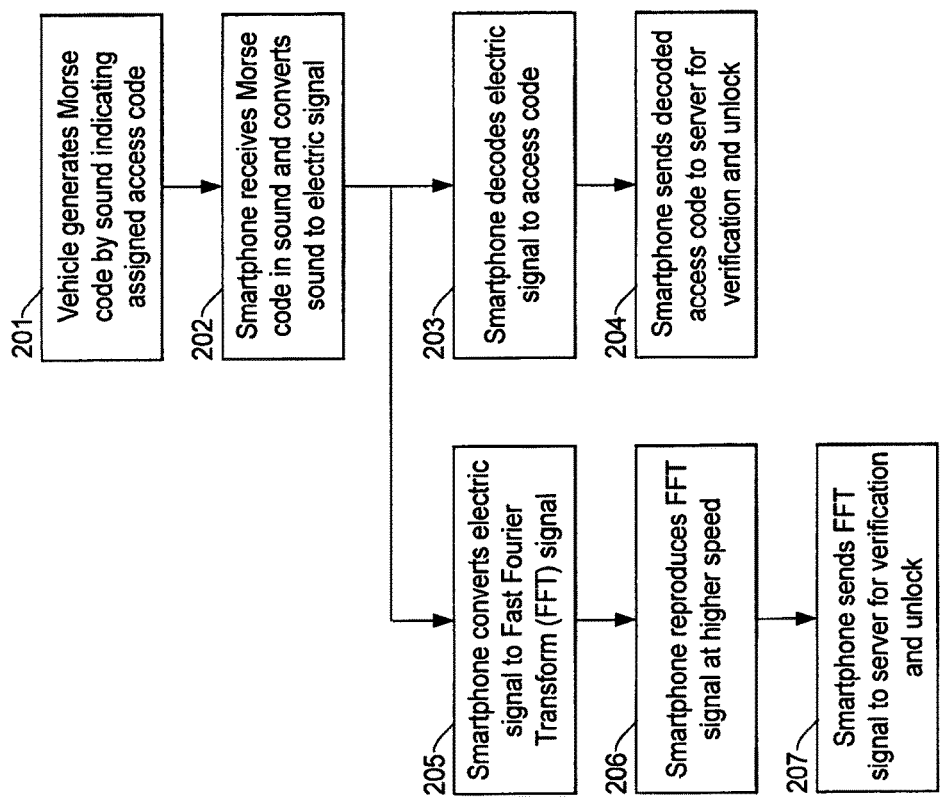
FIG. 12 is a flowchart showing a more detailed operational flow related to the steps 105 and 106 of FIG. 11 in which the pattern or Morse code from the reserved vehicle is expressed by sound.

FIG. 12 is a flowchart showing a more detailed operational flow related to the steps 105 and 106 of FIG. 11 in which the pattern or Morse code from the reserved vehicle 60 is expressed by sound. At step 201, the pattern or Morse code is generated in the form of a sound signal as shown in FIGS. 8 and 9. In the example of FIG. 8, the control box 20 directly generates the pattern or Morse code by, for example, the speaker in the signal generator (see FIG. 14). In the example of FIG. 9, the control box 20 or the head unit 30 causes the vehicle 60 to generate the pattern or Morse code by the horn as a sound signal.

At step 202, the smartphone 40 receives the pattern or Morse code in the form of sound signal from the vehicle 60. Since the user is next to the reserved vehicle 60, he/she can easily receive the pattern or Morse code in the form of the sound signal by directing the smartphone 40 to the vehicle 60. Specifically, the smartphone 40 includes a microphone which can detect the sound wave and converts it to an electric signal.

In step 203, the smartphone 40 decodes the detected pattern or Morse code in the form of the electric signal to the access code by a decoder (see FIG. 15). Then, in step 204, the smartphone 40 sends the access code to the server 50 for verification. Thus, as noted above with respect to the step 107 of FIG. 11, the server 50 compares the access code from the smartphone 40 with the original access code. If the two access codes match with one another, the server 50 sends an unlock command to the control box 20 or the head unit 30, thereby unlocking the vehicle 60.

Instead of the step 203, rather than decoding to the access code, in another preferred embodiment, the smartphone 40 may decode the pattern or Morse code to a FFT (Fast Fourier Transform) signal in step 205. This is typically done by a DSP (Digital Signal Processor) shown in FIG. 15 to convert the detected pattern or Morse Code, a time domain signal, to an FFT signal, a frequency domain signal. As known, an FFT signal is a series of frequency spectrum in the frequency domain where each frequency spectrum is expressed by its amplitude, i.e., frequency/amplitude pairs.

In step 206, the smartphone reproduces the FFT signal obtained in the step 205. As known in the art, the pattern or Morse code generated in the form of sound by the vehicle is very slow and thus, the process of sampling the slow pattern or Morse code before converting to the FFT is also slow. However, once the pattern or Morse code is converted to the FFT signal, the smartphone 40 can reproduce the FFT signal at high speed by, for example, using a high frequency clock signal, to send the FFT signal to the server 50 in a short period of time.

Then, in step 207, the smartphone 40 sends the FFT signal to the server 50 for the authentication of the user and the unlocking procedure. Thus, as noted above with respect to the step 107 of FIG. 11, the server 50 analyzes the FFT signal from the smartphone 40 to see whether the FFT signal reflects the original access code. If the original access code is clearly reflected in the FFT signal, the server 50 sends an unlock command to the control box 20 or the head unit 30, thereby unlocking the vehicle 60.

Figure 13:
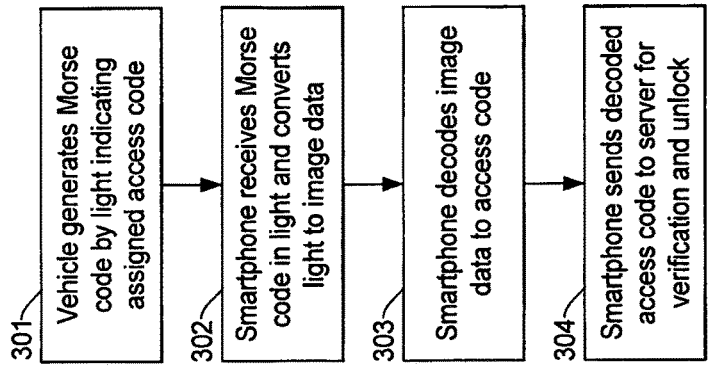
FIG. 13 is a flowchart showing a more detailed operational flow related to the steps 105 and 106 of FIG. 11 in which the pattern or Morse code from the reserved vehicle is expressed by light.

FIG. 13 is a flowchart showing a more detailed operational flow related to the steps 105 and 106 of FIG. 11 in which the pattern or Morse code from the reserved vehicle 60 is expressed by light. At step 301, the pattern or Morse code is generated in the form of a light signal as shown in FIGS. 8 and 9. In the example of FIG. 8, the control box 20 directly generates the pattern or Morse code by, for example, the LED (Light Emitting Diode) in the signal generator (see FIG. 14). In the example of FIG. 9, the control box 20 or the head unit 30 causes the vehicle 60 to generate the pattern or Morse code by the headlight or other light sources as a light signal.

At step 302, the smartphone 40 receives the pattern or Morse code in the form of light signal from the vehicle 60. Since the user is next to the reserved vehicle 60, he/she can easily receive the pattern or Morse code in the form of light signal by directing the smartphone 40 to the vehicle 60. Specifically, the smartphone 40 includes a camera which detects the light signal by its CCD (Charge Coupled Device) image sensor and converts it to image data.

In step 303, the smartphone 40 decodes the detected pattern or Morse code in the form of the image data to the access code by a decoder (see FIG. 15). Then, in step 304, the smartphone 40 sends the access code to the server 50 for verification. Thus, as noted above with respect to the step 107 of FIG. 11, the server 50 compares the access code from the smartphone 40 with the original access code. If the two access codes match with one another, the server 50 sends an unlock command to the control box 20 or the head unit 30, thereby unlocking the vehicle 60.

Figure 14:
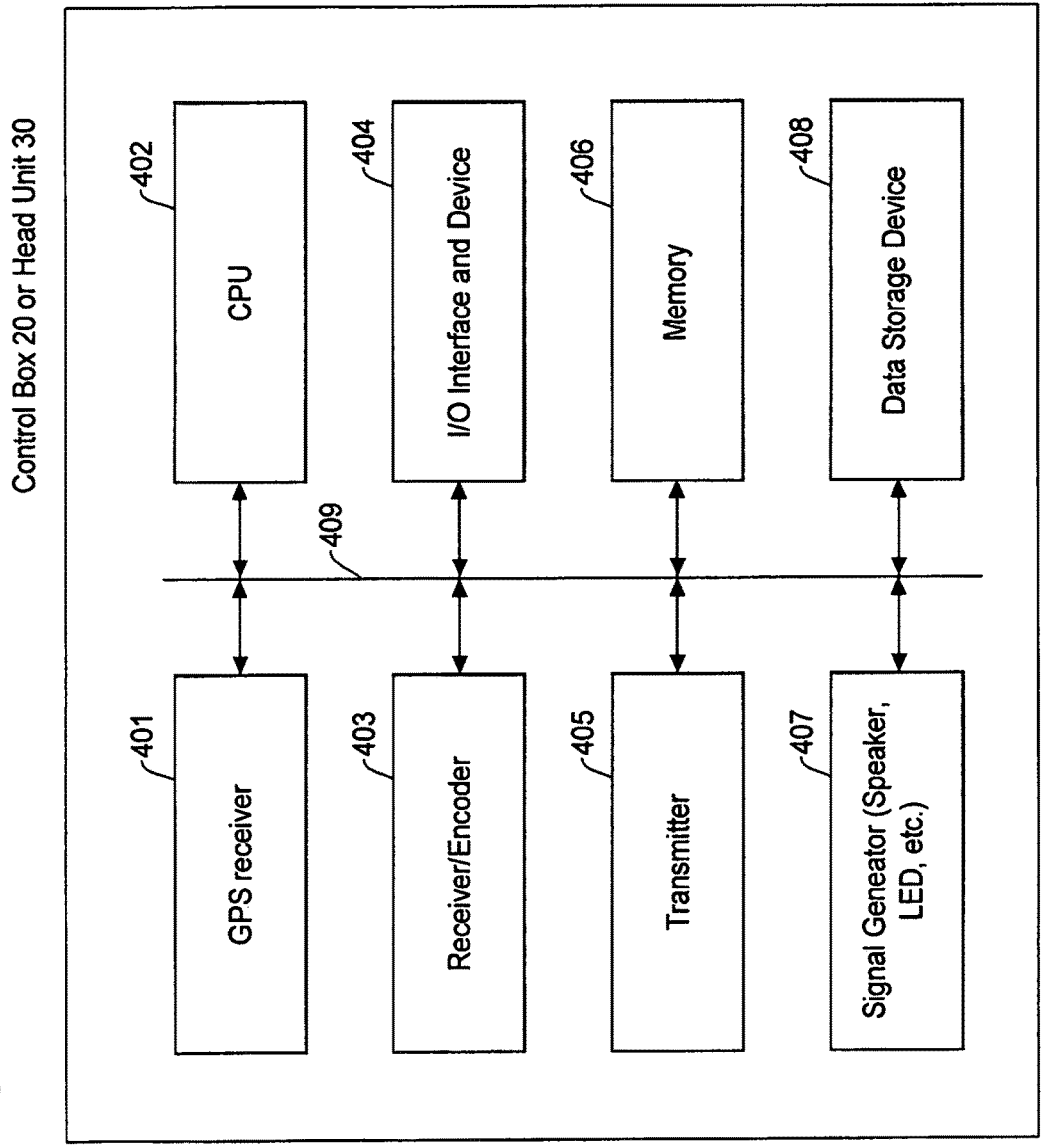
FIG. 14 is a functional block diagram showing an example of structure in the control box or head unit for implementing the method for unlocking the vehicle by using pattern or Morse code authentication in accordance with the present invention.

FIG. 14 is a functional block diagram showing an example of structure in the control box 20 or the head unit 30 for implementing the method for unlocking the vehicle by using the pattern or Morse code in accordance with the present invention. In the case where the method of the present invention is implemented after purchasing a vehicle (after market), the control box 20 will be installed in the vehicle. In contrast, in the case where the present invention is implemented by OEM (Original Equipment Manufacturer) equipment and devices, the head unit 30 originally installed in the vehicle will be used rather than the control box 20. Although the head unit 30 is basically an automobile entertainment system, it should be noted that the block diagram of FIG. 14 shows functional blocks of the head unit 30 only related to the present invention.

The control box 20 or the head unit 30 of FIG. 14 includes a GPS receiver 401 to receive GPS signals from a plurality of GPS satellites to determine the current position of the vehicle 60. Such GPS data indicating the current position of the vehicle 60 will be sent to the server 50 to compare with the GPS data from the user as shown in FIG. 7. A CPU (Central Processing Unit) 402 controls an overall operation of the control box 20 or the head unit 30 based on a program. A receiver/encoder 403 is provided to receive an access code from the server 50 and to encode the access code to the pattern or Morse code as shown in FIGS. 8 and 9.

An I/O interface and device 404 is configured to interface with various components of the vehicle 60 for initial setting at the time of installation, driving the horn or headlight of the vehicle 60 for generating the pattern or Morse code by sound or light, unlocking the vehicle based on the unlock command from the server 50, etc. A transmitter 405 is provided to transmit signals or data to the outside, for example, the GPS data from the GPS receiver 401 to the server 50 as shown in FIG. 7. A memory 406 temporarily stores data or information for operation of the control box 20 or the head unit 30 under the control of the CPU 402.

A signal generator 407 may be provided to generate the pattern or Morse code in the form of sound or light by the dedicated speaker of the LED light so that the user's smartphone 40 can detect the pattern or Morse code directly from the control box 20 or the head unit 30. A data storage device 408 stores data such as map data to be used for the operation of the unlocking method of the present invention. All of the functional blocks described above are connected to a system bus 409 which will be further connected to the CAN (Control Area Network) bus of the vehicle 60 for communication and control.

FIG. 15 is a functional block diagram showing an example of structure in the mobile device, typically a smartphone, for implementing the method for unlocking the vehicle by using the pattern or Morse code in accordance with the present invention. It should be noted that the block diagram of FIG. 15 shows functional blocks of the smartphone 40 only related to the present invention. As shown in FIG. 3, the smartphone 40 has downloaded and installed the "car-sharing" application 41, typically from the server 50, so that the functional blocks of FIG. 15 are now configured in the smartphone 40.

The smartphone 40 includes a GPS receiver 501 to receive GPS signals from a plurality of GPS satellites and to determine the current position of the user holding the smartphone 40. When making the unlock request, such GPS data indicating the current position of the user will be sent to the server 50 to compare with the GPS data from the vehicle 60 (control box 20 or head unit 30) as shown in FIG. 7. A CPU (Central Processing Unit) 502 controls an overall operation of the smartphone 40 including the "car-sharing" application. A signal receiver (microphone, camera, etc.) is provided to detect the pattern or Morse code generated by the control box 20 or the vehicle 60 as shown in FIGS. 8 and 9.

An I/O interface and device 504 is configured to interface between the user and various components of the smartphone 40 for initial setting at the time of installation of the application, receiving user inputs, selecting menus, selecting keys, etc. A receiver/transmitter 505 is provided to receive signals or data from the outside and to transmit signals or data to the outside. For example, the receiver/transmitter 505 receives information regarding availability of vehicles from the server 50 when making the reservation as shown in FIG. 5, transmits the unlock request and the GPS data to the server 50 as shown in FIG. 7 and transmits the decoded access code or FFT signal to the server 50 as shown in FIG. 10. A memory 506 temporarily stores data or information for operation of the smartphone 40 under the control of the CPU 502.

A decoder 507 is provided to decode the pattern or Morse code to the access code for sending it to the server 50 for verification before unlocking the vehicle 60. A data storage device 508 stores data such as map data to be used for the operation of the unlocking method of the present invention. A display device 510 displays data, text, images, menus, etc., as a graphical human-machine interface. A digital signal processor (DSP) 511 may be provided to convert the pattern or Morse code detected by the signal receiver 503 to the FFT signal as noted above. All of the functional blocks described above are connected to a system bus 509.

As has been described above, according to the present invention, since the process of unlocking the shared vehicle is performed with use of simpler and lower cost communication method and device, it is possible to dramatically decrease an overall cost involving the vehicle sharing service. Namely, the access code from the server is encoded to the pattern or Morse code which can be generated in the form of sound or light by using the existing resources such as the horn or the headlight of the vehicle or the low cost speaker or LED in the control box. Further, because the generated pattern or Morse code is detected by the pre-existing mobile device of the user, typically the smartphone, it is unnecessary to use an access card required in the conventional technology, which further makes it possible to decrease the overall cost.

Although the method and system of the present invention for unlocking the shared vehicle by using the pattern or Morse code is described herein with reference to the preferred embodiments, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of unlocking a shared vehicle, comprising the following steps of:
    making a reservation to use a vehicle through a communication between a user and a remote server, where the vehicle is installed with a control box or a head unit designed to conduct operations related to the method of unlocking a vehicle;
    sending an unlock request to the server via a mobile device of the user when the user has reached a location of the reserved vehicle;
    sending an access code from the server to the control box or head unit;
    encoding the access code to a coded pattern by the control box or head unit;
    generating the coded pattern in a form of sound signal or light signal with use of a sound source or a light source of the reserved vehicle;
    detecting the coded pattern in the form of the sound signal or the light signal by the mobile device;
    decoding the detected coded pattern to the access code by the mobile device and sending the access code to the server via the mobile device; and
    sending an unlock command from the server to the control box or head unit when the access code from the mobile device matches with the original access code sent to the control box or head unit, thereby allowing the user to gain access to the reserved vehicle.

2. The method of unlocking a shared vehicle as defined in claim 1,
    wherein the control box is installed in a shared vehicle in an after market situation; and
    wherein the head unit is an automobile entertainment system of the shared vehicle and additionally includes a configuration identical to that of the control box in an OEM (Original Equipment Manufacturer) situation.

3. The method of unlocking a shared vehicle as defined in claim 1, wherein said step of sending the unlock request to the server via the mobile device includes a step of sending GPS data of the mobile device indicating a current position of the user to the server.

4. The method of unlocking a shared vehicle as defined in claim 1, wherein said step of sending the access code from the server includes a step of checking an identity of the user making the unlock request.

5. The method of unlocking a shared vehicle as defined in claim 1, wherein said step of sending the access code from the server includes steps of
    comparing the GPS data from the mobile device and GPS data retrieved from the control box or head unit indicating a current position of the reserved vehicle; and
    proceeding to the step of sending the access code from the server only when the current position of the user and the current position of the reserved vehicle match with one another.

6. The method of unlocking a shared vehicle as defined in claim 1, wherein said step of generating the coded pattern in the form of sound signal or light signal includes a step of generating the coded pattern in the form of sound signal by a horn of the vehicle, or generating the coded pattern in the form of light signal by a headlight of the vehicle.

7. The method of unlocking a shared vehicle as defined in claim 1, wherein said step of generating the coded pattern in the form of sound signal or light signal includes a step of generating the coded pattern in the form of sound signal by a speaker provided in the control box or head unit, or generating the coded pattern in the form of light signal by an LED (Light Emitting Diode) provided in the control box or head unit.

8. The method of unlocking a shared vehicle as defined in claim 1, wherein said step of detecting the coded pattern by the mobile device includes a step of converting the coded pattern in the form of sound signal to an electric signal by a microphone of the mobile device, or a step of converting the coded pattern in the form of light signal to image data by an image sensor of the mobile device.

9. The method of unlocking a shared vehicle as defined in claim 1, wherein instead of said step of decoding the detected coded pattern to the access code and sending it to the server, further comprising a step of converting the detected coded pattern to an FFT (Fast Fourier Transform) signal by the mobile device and sending the FFT signal to the server.

10. The method of unlocking a shared vehicle as defined in claim 9, further comprising a step of analyzing, by the server, the FFT signal from the mobile device to determine whether the FFT signal sufficiently reflects the original access code sent to the control box or head unit for verification before sending the unlock command.

11. A system of unlocking a shared vehicle, comprising:
a server operated by a service provider of vehicle sharing service that receives a reservation made by a user to use a vehicle through a communication with the server;
a control box or a head unit installed in a reserved vehicle to conduct operations related to the process of unlocking the reserved vehicle; and
a mobile device of the user to communicate with the server regarding the process of unlocking the reserved vehicle and to detect signals from the reserved vehicle;
wherein the mobile device is configured to send an unlock request to the server when the user has reached a location of the reserved vehicle;
wherein the server is configured, upon receiving the unlock request from the mobile device, to send an access code to the control box or head unit;
wherein the control box or head unit is configured to encode the access code to a coded pattern, and to cause the reserved vehicle to generate the coded pattern in a form of sound signal or light signal with use of a sound source or a light source of the reserved vehicle;
wherein the mobile device is further configured to detect the coded pattern in the form of the sound signal or the light signal, to decode the detected coded pattern to the access code, and to send the access code to the server; and
wherein the server is further configured to send an unlock command to the control box or head unit when the access code from the mobile device matches with the original access code sent to the control box or head unit, thereby allowing the user to gain access to the reserved vehicle.

12. The system of unlocking a shared vehicle as defined in claim 11,
wherein the control box is installed in a shared vehicle in an after market situation; and
wherein the head unit is an automobile entertainment system of the shared vehicle and additionally includes a configuration identical to that of the control box in an OEM (Original Equipment Manufacturer) situation.

13. The system of unlocking a shared vehicle as defined in claim 11, wherein, with respect to sending the unlock request to the server, the mobile device is further configured to send GPS data of the mobile device indicating a current position of the user to the server.

14. The system of unlocking a shared vehicle as defined in claim 11, wherein, with respect to sending the access code, the server is further configured to check an identity of the user making the unlock request.

15. The system of unlocking a shared vehicle as defined in claim 11, wherein, with respect to sending the access code, the server is further configured to compare the GPS data from the mobile device and GPS data retrieved from the control box or head unit indicating a current position of the reserved vehicle, and to proceed to send the access code from the server only when the current position of the user and the current position of the reserved vehicle match with one another.

16. The system of unlocking a shared vehicle as defined in claim 11, wherein, with respect to generating the coded pattern in the form of sound signal or light signal, the control box or head unit is configured to cause a horn of the reserved vehicle to generate the coded pattern in the form of sound signal, or to cause a headlight of the reserved vehicle to generate the coded pattern in the form of light signal.

17. The system of unlocking a shared vehicle as defined in claim 11, wherein, with respect to generating the coded pattern in the form of sound signal or light signal, the control box or head unit is further configured to include a speaker to generate the coded pattern in the form of sound signal, or an LED (Light Emitting Diode) to generate the coded pattern in the form of light signal.

18. The system of unlocking a shared vehicle as defined in claim 11, wherein, with respect to detecting the coded pattern, the mobile device is configured to include a microphone to convert the coded pattern in the form of sound signal to an electric signal, or an image sensor to convert the coded pattern in the form of light signal to image data.

19. The system of unlocking a shared vehicle as defined in claim 11, wherein, instead of decoding the detected coded pattern to the access code and sending it to the server, the mobile device is further configured to convert the detected coded pattern to an FFT (Fast Fourier Transform) signal and to send the FFT signal to the server.

20. The system of unlocking a shared vehicle as defined in claim 19, wherein the server is further configured to analyze the FFT signal from the mobile device to determine whether the FFT signal sufficiently reflects the original access code sent to the control box or head unit for verification before sending the unlock command.

* * * * *